(12) United States Patent
Oh et al.

(10) Patent No.: US 7,286,507 B1
(45) Date of Patent: Oct. 23, 2007

(54) METHOD AND SYSTEM FOR DYNAMICALLY ROUTING BETWEEN A RADIO ACCESS NETWORK AND DISTRIBUTED ANTENNA SYSTEM REMOTE ANTENNA UNITS

(75) Inventors: Dae-Sik Oh, Overland Park, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 108 days.

(21) Appl. No.: 11/243,023

(22) Filed: Oct. 4, 2005

(51) Int. Cl.
*H04Q 7/20* (2006.01)
*H04Q 7/22* (2006.01)

(52) U.S. Cl. ............... 370/334; 370/329; 370/328; 370/312; 370/313; 370/340; 370/341; 455/426.1; 455/426.2; 455/466; 455/403; 455/422.1; 455/500

(58) Field of Classification Search ........... 370/334, 370/329, 328, 338, 312, 313, 340, 341; 455/426.1, 455/426.2, 422, 403, 466, 414.1, 445, 500, 455/517, 561, 567.1, 560
See application file for complete search history.

(56) References Cited

U.S. PATENT DOCUMENTS 7,099,339 B1 * 8/2006 Wang et al. ............ 370/401

| | | | |
|---|---|---|---|
| 2001/0002198 A1* | 5/2001 | Lindgren et al. | 370/466 |
| 2003/0216140 A1* | 11/2003 | Chambert | 455/426.1 |
| 2004/0139201 A1* | 7/2004 | Chaudhary et al. | 709/229 |
| 2005/0213555 A1* | 9/2005 | Eyuboglu et al. | 370/349 |

OTHER PUBLICATIONS

LGC Wireless®, http://web.archive.org/web/20050207125302/ http://www.lgcwireless. . ., dated 2005.
Coverage Enhancement Solutions, Juni America, Inc., "Adding Value to the Mobile World!", Jun. 2005.

* cited by examiner

*Primary Examiner*—Keith Ferguson

(57) ABSTRACT

An improved mechanism for routing communication traffic between a radio access network and distributed antenna system (DAS) remote antenna units. In accordance with an exemplary embodiment of the invention, a DAS hub and each DAS antenna unit served by the DAS hub will sit as a respective node on a packet-switched network. Further, the DAS hub will maintain or otherwise have access to a set of mapping data that correlates one or more radio access network coverage segments (e.g., cell sectors) with one or more DAS antenna unit addresses on the packet-switched network (e.g., IP addresses). Advantageously, an administrator of the DAS can then configure or alter the mapping data whenever desired, to conveniently set the RAN-DAS correlations and to thereby distribute RAN coverage in a desired manner throughout the DAS.

17 Claims, 5 Drawing Sheets

DAS MAPPING DATA

| RAN COVERAGE SEGMENT(S) | DAS ANTENNA UNIT IP ADDRESS(ES) |
|---|---|
| A | xxx.xxx.xxx.1, xxx.xxx.xxx.2, xxx.xxx.xxx.3, xxx.xxx.xxx.6 |
| B | xxx.xxx.xxx.5 |
| C | xxx.xxx.xxx.4 |

FIG. 2

METHOD AND SYSTEM FOR DYNAMICALLY ROUTING BETWEEN A RADIO ACCESS NETWORK AND DISTRIBUTED ANTENNA SYSTEM REMOTE ANTENNA UNITS

FIELD OF THE INVENTION

The present invention relates to wireless communications and more particularly to the arrangement and operation of distributed antenna systems.

DESCRIPTION OF RELATED ART

The art and popularity of wireless communications has grown significantly over recent years. Indeed, millions of people are engaging in voice and data communications using wireless communication devices such as cellular telephones and Personal Digital Assistants (PDAs). In principle, a user can communicate over the Internet or call anyone over the Public Switched Telephone Network (PSTN) from any place inside the coverage area of a cellular wireless network.

In a typical cellular wireless network, an area is divided geographically into a number of cells and cell sectors, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) or packet data serving node (PDSN) for instance. The switch or gateway may then be coupled with a transport network, such as the PSTN or a packet-switched network (e.g., the Internet). Conveniently with this arrangement, when a wireless communication device is positioned within a given sector, the device can communicate with entities on the transport network via a communication path comprising the BTS, the BSC, the switch or gateway, and the transport network.

To provide a high quality of wireless communication service, it is desirable for wireless coverage areas such as cells and cell sectors to be adjacent to one another, leaving no intermediate gaps in which service is unavailable. Likewise, it is desirable to arrange each wireless coverage area such that its corresponding BTS has the capacity to handle all the communication sessions carried out by users at peak times within the coverage area. Thus, a central business district in which many wireless devices are used during the business day is typically provided with a higher density of base stations, each producing smaller coverage areas than would be provided in outlying areas.

Designing a cellular network for a high quality of service thus involves a number of issues. For example, to avoid gaps in service areas, or so-called "coverage holes," it may appear desirable to design larger cells that are served by base stations with high-power antennas. However, a larger cell would encompass more subscribers and may cause calls to be dropped if the capacity of the BTS is exceeded. On the other hand, increasing the number (and, accordingly, the density) of base stations can be costly, not to mention the regulatory and architectural challenge of finding (and leasing) a desirable location for each BTS and the task of arranging for backhaul communications from each new BTS to other network entities such as the BSC and MSC.

To provide flexibility in the design of mobile telephone networks, "distributed antenna systems," also known as remote antenna systems, have been developed. Generally speaking, a distributed antenna system (DAS) functions to extend the RF coverage of one or more BTSs into a desired area, such as a building or office campus for instance. To accomplish this, a DAS typically includes a distribution hub unit (DHU) that engages in RF communication with a BTS and that is linked by fiber, UTP, or coax cable connections with multiple remote antenna units positioned strategically throughout the area to be covered. The DHU may thus receive incoming RF communication traffic from the BTS and pass the traffic over the various cable connections to the remote antenna units, which would then emit the incoming traffic wirelessly for receipt by devices operating in their localized antenna coverage areas. Similarly, the remote antenna units may receive outgoing RF communication traffic from devices operating in their coverage areas and may pass the traffic over their various cable connections to the DHU, and the DHU may then transmit the outgoing traffic to the BTS.

For instance, to provide improved wireless coverage within a high-rise building, a DHU could be installed in a basement of the building and could be set to communicate by a wireless, fiber, and/or or cable link with a cellular BTS. Further, one or more remote antenna units could be installed on each floor of the high-rise, and each antenna unit may be coupled by a respective fiber, UTP, or coax cable connection with the DHU in the basement. In practice, users operating on any floor of the building can then conveniently engage in cellular wireless communication, via a communication path comprising (i) a remote antenna unit on their floor, (ii) the cable connection between the remote antenna unit and the DHU, and (iii) the RF link between the DHU and the BTS.

SUMMARY

The present invention provides an improved mechanism for routing communication traffic between a radio access network and DAS remote antenna units. In accordance with an exemplary embodiment of the invention, a DHU and each DAS remote antenna unit served by the DHU will sit as a respective node on at least one packet-switched network (e.g., IP network, ATM network, etc.) Further, the DHU will maintain a set of mapping data that correlates one or more coverage segments of a cellular radio access network with one or more DAS antenna unit addresses on the packet-switched network (e.g., DAS antenna unit IP addresses). Advantageously, an administrator of the DAS can then alter the mapping data whenever desired, to conveniently change the RAN-DAS correlations, so as to distribute RAN coverage in a desired manner among the DAS antenna units.

In one respect, an exemplary embodiment of the invention may thus take the form of a DAS that includes a DAS hub that communicates with a cellular RAN on one or more RAN coverage segments defined by the RAN, and that includes a plurality of DAS antenna units. In accordance with the exemplary embodiment, a packet-switched network will connect the DAS hub with the DAS antenna units, with each DAS antenna unit having a respective IP address on the packet-switched network. Data storage, maintained by the DAS hub for instance, will then contain mapping data that correlates the DAS antenna units with the one or more RAN coverage segments, and the DAS hub will use the mapping data to route communication traffic between the one or more RAN coverage segments and the IP addresses of the DAS antenna units.

Each RAN coverage segment may take the form of a cell or cell sector defined in a particular way by the RAN. For instance, each coverage segment may be a CDMA sector having a respective PN-offset to distinguish it from adjacent sectors. As other examples, each coverage segment may be a cell or sector operating on a respective RF frequency channel or coverage areas produced by respective base stations. A given RAN coverage segment can further be a combination of sectors or other coverage areas.

In operation, when the DAS hub of the exemplary system receives incoming communication traffic (signaling and/or bearer data) in a source RAN coverage segment (e.g., traffic transmitted in an RAN sector defining a particular PN-offset), the DAS hub may use the mapping data to identify at least one destination DAS antenna unit IP address corresponding with the source RAN coverage segment. The DAS hub may then forward the incoming communication traffic via the packet-switched network to the identified destination IP address(es).

Similarly, when the DAS hub receives outgoing communication traffic (signaling and/or bearer data) via the packet-switched network from a source IP address of a DAS antenna unit, the DAS hub may use the mapping data to identify at least one destination RAN coverage segment corresponding with the source IP address, and the DAS hub may forward the outgoing communication traffic in the identified destination RAN coverage segment(s) to the RAN.

Preferably, the mapping data maintained in the DAS data storage will be alterable, so as to allow an administrator or automated system to modify the correlations between RAN coverage segments and DAS antenna unit IP addresses. To facilitate this, for instance, DAS hub may provide a web based user-interface through which an administrator can view and edit the mapping data. In this way, the mapping data can be changed whenever desired, so as to distribute coverage of the RAN in a desired manner throughout the DAS.

In another respect, an exemplary embodiment of the invention may take the form of a method that involves maintaining and using mapping-data in a DAS. Such a method may involve (i) maintaining at the DAS a set of mapping data that correlates IP addresses of DAS antenna units with one or more RAN coverage segments, and (ii) using the mapping data to route communication traffic between the RAN and the DAS antenna unit IP addresses.

Further, the method may involve changing the mapping data so as to alter correlations between the RAN coverage segments and DAS antenna unit IP addresses, thereby modifying distribution of RAN capacity among the various DAS antenna units. For example, the change in mapping data could involve establishing a correlation between a given RAN coverage segment and a DAS antenna unit IP address with which the RAN coverage segment was not previously correlated. As another example, the change in mapping data could involve establishing a correlation between a given DAS antenna unit IP address and a RAN coverage segment with which the IP address was not previously correlated. As yet another example, the change may involve removing one or more correlations that were defined by the mapping data.

These as well as other aspects, advantages, and alternatives will become apparent to those of ordinary skill in the art by reading the following detailed description with reference where appropriate to the accompanying drawings. Further, it should be understood that the description provided in this summary and below is set forth by way of example only.

BRIEF DESCRIPTION OF THE DRAWINGS

FIG. 2 is an illustration of an exemplary set of mapping data that a DAS hub can use to route communication traffic between a RAN and various DAS antenna unit IP addresses.

DETAILED DESCRIPTION

Figure 1:
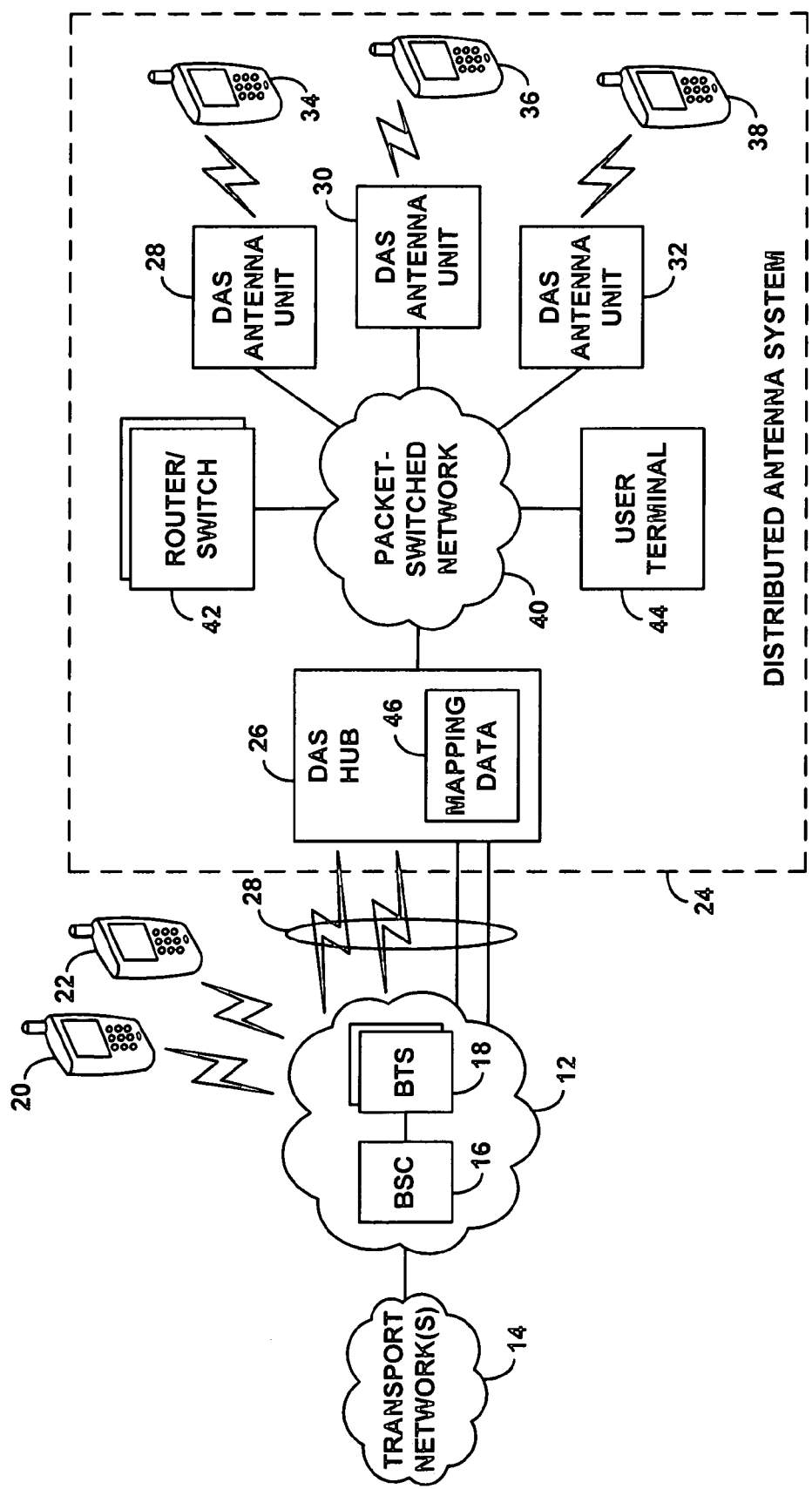
FIG. 1 is a simplified block diagram of a communication system arranged in accordance with the exemplary embodiment.

Referring to the drawings, FIG. 1 is a simplified block diagram of a system arranged in accordance with an exemplary embodiment of the invention. It should be understood, of course, that this and other arrangements and functions described herein are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

The system of FIG. 1 includes at its center a radio access network (RAN) 12, which functions in a generally known manner to engage in radio frequency (RF) communication with one or more client devices and to provide the client devices with connectivity to one or more transport networks 14, such as the PSTN or the Internet for instance. RAN 12 can take various forms, the details of which are not particularly significant. As shown by way of example, for instance, RAN 12 may include a BSC 16 and one or more BTSs 18, with each BTS having radio equipment and an antenna structure (not shown) for engaging in RF air interface communication with wireless client devices 20, 22, such as cell phones or wirelessly-equipped personal digital assistants (PDAs) or computers.

Generally speaking, RAN 12 defines one or more RAN coverage segments, each of which constitutes a mechanism in or through which the RAN communicates with client devices that it serves. A RAN coverage segment may be a cell, cell sector, or other coverage area of the RAN, defined by a directional radiation pattern from a BTS of the RAN for instance. Further, or alternatively, a RAN coverage segment may be defined as the portion of RAN coverage that uses a particular carrier frequency and/or a particular spreading code or other parameter to characterize communications. For instance, in a system operating according to the well known CDMA protocol, an example RAN coverage segment may be a cell sector in which communications occur on a 1.25 MHz channel centered around a particular carrier frequency and are modulated using a PN-offset code locally unique to the sector and/or using one or more particular Walsh codes. Other examples of RAN coverage segments are possible as well.

The system of FIG. 1 further includes a distributed antenna system (DAS) 24, which functions advantageously to extend coverage of RAN 12 into a building, campus, or other designated area. DAS 24 includes a DAS hub 26, which communicates with RAN 12 over one or more physical-layer connections 28. Generally, each physical-layer connection between RAN 12 and DAS hub 26 facilitates an exchange of RF traffic (bearer and/or signaling) between the RAN 12 and the DAS hub 26. As such, each physical-layer connection can take various forms, examples of which include an RF-over-air connection, an RF-over-fiber connection, and an RF-over-cable (or hybrid fiber/cable) connection. Further, a given physical-layer connection can be a combination of these or other types of links, and RF signals can be converted to and from other forms throughout each connection if desired.

To provide an RF-over-air connection between RAN 12 and DAS hub 26, for example, DAS hub 26 may be equipped with one or more antennas (such as a fixed antenna structure or a dynamically configurable smart-antenna, for example), to facilitate air interface communication with the RAN 12. The antenna(s) may facilitate directional communication with one or more BTSs of the RAN and/or with a single BTS of the RAN. In practice, the DAS hub 26 may be situated in a basement and/or equipment room of a building or campus that is to be served by the DAS, and the DAS hub 26 may be coupled by an RF cable connection with an antenna structure on a roof or external wall, to enable optimal wireless communication between the antenna(s) and the RAN.

To provide an RF-over-fiber connection between the RAN 12 and the DAS hub 26, as another example, BTS radio equipment of the RAN can be connected by one or more fiber-optic cables in a well known manner with the DAS hub 26. In this way, signals that are to be communicated from the RAN 12 to the DAS hub 26 would be converted to optical pulses if necessary and sent over the fiber-optic cable(s) from the RAN to the DAS hub 26, where the signals may then be converted to a form suitable for handling by the DAS 24. Similarly, signals that are to be communicated from the DAS hub 26 to the RAN 12 would be converted to optical pulses at the DAS hub 26 if necessary and sent over the fiber-optic cable(s) from the DAS hub 26 to the BTS radio equipment, where the signals may then be converted to a form suitable for handling by the RAN 12.

In a preferred embodiment, DAS hub 26 may include an RF communication chipset such as a "mobile station modem" (MSM) of the type available from Qualcomm Incorporated, which comes in various models to facilitate RF communication according to various radio-link protocols. Such a chipset may, for instance, include a rake-receiver and/or other circuitry that is adapted to receive and resolve incoming signals based on characteristics such as carrier-frequency, spreading-code, and so forth, and to transmit outgoing signals with similar characteristics as desired. That way, the DAS hub 26 may discern the RAN coverage segment of traffic arriving from RAN 12, and the DAS hub 26 may transmit outgoing traffic in a desired RAN coverage segment to RAN 12.

As shown in FIG. 1, DAS 24 further includes a plurality of DAS remote antenna units 28, 30, 32, one or more of which may situated respectively in each of a plurality of zones of the DAS 24 coverage area so as to provide RF coverage in each zone and to facilitate air interface communication with wireless client devices 34, 36, 38, such as cell phones or wirelessly-equipped PDAs or computers operating in the zones. In practice, for example, one or more DAS antenna units may be situated in each of a plurality of rooms or floors of a building or campus, to provide RF coverage respectively in each room or floor. Although only three DAS antenna units are shown in FIG. 1, it should be understood that more or fewer DAS antenna units could be provided. Preferably, however, the DAS 24 will include at least two DAS antenna units, facilitating distribution of RF signals among at least two zones of the DAS coverage area.

In accordance with the exemplary embodiment, the DAS hub 26 and each DAS antenna unit will sit as a respective node on a common packet-switched network (or plurality of packet-switched networks) 40, to facilitate packet-data communication between the DAS hub and each DAS antenna unit. The packet-switched network 40 is preferably a conventional IP network of the type commonly used in many offices and homes. More generally, the packet-switched network can be a local area network (LAN), wireless local area network (WLAN) (e.g., an IEEE 802.11 wireless extension of a LAN), metropolitan area network (MAN), or any combination of these or other packet-switched networks, possibly comprising all or part of the Internet, whether private and/or public. As such, the packet-switched network 40 may include one or more routers, switches, and/or hubs 42 arranged to route or pass packet-data traffic through the network from one point to another.

Conveniently, the DAS 24 (including the hub and antenna units) may be installed in a building, campus, or other area that is already equipped (e.g., wired) with the packet-switched network 40. Thus, the packet-switched network 40 may be an existing packet-switched network that is used for purposes other than distribution of DAS traffic (such as a home or corporate computer network for instance). Alternatively, the packet-switched network 40 may be installed at the time the DAS 24 is installed, to facilitate operation of the DAS in the manner presently described.

DAS hub 26 and each of the DAS antenna units 28, 30, 32 respectively include a mechanism for connecting with the packet-switched network, for acquiring an IP address on the packet-switched network, and for sending and receiving IP data packets (e.g., TCP/IP or UDP/IP) over the packet-switched network. By way of example, the DAS hub 26 and each DAS antenna unit may include a respective built-in network interface module such as an Ethernet network interface card (NIC) that provides an RJ-45 jack suitable for coupling with an Ethernet cable tied to the router/switch and that can be programmatically configured to use a particular IP address as its IP address on network 40.

Alternatively, an 802.11 or other WLAN connection can be provided, assuming one or more suitably positioned 802.11 access points are provided, in which case the DAS hub 26 and/or one or more of the DAS antenna units could be equipped with 802.11 client modules and antennas for communicating with the 802.11 access point(s) and for acquiring an IP address for communication on network 40 (possibly through use of network address translation). Such an 802.11 or other WLAN link could thus provide a mechanism for communication of RF signals over network 40 between the DAS hub 26 and each DAS antenna unit.

Still alternatively, a DAS hub or DAS antenna unit that does not have a built-in network interface but that has an input/output port of another type (e.g., a fiber or RF cable interface) could be retrofitted to work with the present invention, by coupling the input/output port (through an appropriate signal converter, such as an electro-optic coupler) with a device such as a computer that is equipped with a mechanism suitable for connecting with network 40 and for using a particular IP address for communicating on the network. With such an arrangement, the external network-connection mechanism would be considered to be functionally part of the hub or antenna unit, and thus the hub or antenna unit would be considered to have the IP address that the external network-connection mechanism has on network 40

In a preferred embodiment, IP addresses will be statically assigned to the DAS hub 26 and each DAS antenna unit 28, 30, 32. To facilitate this, the DAS hub and each DAS antenna unit may be programmed with respective web server logic and a respective web-based setup interface with which a user can interact via a web browser on an user terminal (e.g., PC) 44 connected with network 40. For this purpose, the DAS hub and each DAS antenna unit may have a respective predefined IP address at which their setup interfaces can be accessed. Thus, a user operating terminal 44 may browse to the setup interface of the DAS hub 26 and assign the DAS hub 26 a particular IP address on network 40 for purposes of communicating with the DAS antenna units, and the user may browse to the setup interface of each DAS antenna unit and assign the DAS antenna another IP address on network 40 for purposes of communicating with DAS hub 26. Preferably, the IP addresses assigned to the DAS hub and to each DAS antenna unit will be on a common IP subnet, in order to facilitate IP communication between the DAS hub 26 and each DAS antenna unit.

In an alternative embodiment, IP addresses can be assigned dynamically to the DAS hub 26 and to each DAS antenna unit, using the Dynamic Host Control Protocol (DHCP) or another dynamic IP address assignment mechanism. To use DHCP, a DHCP server or DHCP server function (not shown) would be provided on network 40, such as in switch/router 42 for instance, or even as part of DAS hub 26 itself. While dynamic IP address assignment is feasible, however, static assignment of IP addresses is preferred, in order to maintain the integrity of mapping data in the DAS hub 26, as will be described next.

In accordance with the exemplary embodiment, as shown generally in FIG. 1, DAS hub 26 will maintain in data storage a set of mapping data 46. Mapping data 46 serves to correlate one or more RAN coverage segments of RAN 12 with one or more IP addresses of the various DAS antenna units in DAS 24, to thereby indicate how DAS hub 26 should distribute capacity of RAN 12 among the various zones of the DAS 24 via packet-switched network 40. In operation, when DAS hub 26 receives incoming traffic in a particular RAN coverage segment from RAN 12, DAS hub 26 may automatically consult the mapping data 46 to determine one or more DAS antenna unit IP addresses to which it should route that incoming traffic via packet-switched network 40. Similarly, when DAS hub 26 receives outgoing traffic from a particular DAS antenna unit IP address on packet-switched network 40, DAS hub 26 may automatically consult the mapping data 46 to determine one or more RAN coverage segments in which it should transmit the outgoing data to RAN 12.

In a preferred embodiment, the mapping data will provide symmetric correlations for incoming and outgoing traffic, in order to allow RAN 12 to communicate with a wireless device in both directions on a common RAN coverage segment. For example, the mapping data may correlate a given RAN coverage segment symmetrically with two particular DAS antenna unit IP addresses, so as to indicate that (i) when the DAS hub receives incoming traffic in the given RAN coverage segment, the DAS hub should route the incoming traffic via network 40 to both DAS antenna unit IP addresses and (ii) when the DAS hub receives outgoing traffic from either of the two DAS antenna unit IP addresses, the DAS hub should transmit the outgoing traffic to RAN in the given RAN coverage segment.

Applying that example in practice, when the DAS hub 26 receives incoming traffic in the given RAN coverage segment, the DAS hub 26 may refer to the mapping data to determine that the given RAN coverage segment corresponds with the two particular DAS antenna unit IP addresses. In response, the DAS hub 26 may then convert the incoming traffic to a digitized bit stream if necessary, packetize the bit stream into a sequence of IP packets, and transmit those IP packets via network 40 to each one of the two corresponding DAS antenna unit IP addresses. Upon receipt of those IP packets at the DAS antenna units having the destination IP addresses, each recipient DAS antenna unit may then depacketize the digitized bit stream, convert the bit stream to an RF signal, and emit the RF signal via its antenna for receipt by any wireless client devices operating in its local coverage area.

Conversely, when either of the two DAS antenna units receives outgoing traffic from a wireless client device operating in its local coverage area, the DAS antenna unit may convert the outgoing traffic to a digitized bit stream if necessary, packetize the bit stream into a sequence of IP packets, and transmit those IP packets via network 40 from its IP address to the IP address of the DAS hub 26. Upon receipt of those IP packets, the DAS hub 26 may then refer to the mapping data to determine that the source IP address of the packets corresponds with the given RAN coverage segment. Thus, the DAS hub 26 may depacketize the digitized bit stream, convert the bit stream to an RF signal, and transmit the RF signal in the given RAN coverage segment to the RAN 12.

In an alternative embodiment, the mapping data 46 could define asymmetric correlations between RAN coverage segments and DAS antenna unit IP addresses. For instance, the mapping data 46 could specify that (i) incoming traffic in a particular RAN coverage segment A should be routed to DAS antenna unit IP addresses 1, 2, and 3, but that (ii) outgoing traffic from DAS antenna unit IP address 1 should be routed in another RAN coverage segment B, and (iii) outgoing traffic from DAS antenna unit IP addresses 2 and 3 should be routed in yet another RAN coverage segment C. Such asymmetric mapping could give rise to greater complexity and may thus be undesirable in many situations. However, in some situations, such as where a reason exists to treat forward link and reverse link communications separately, asymmetric mapping could be desirable.

Mapping data 46 can take various forms, the specifics of which are not critical. As a simple example, for instance, the mapping data may take the form of a data table that lists RAN coverage segments in one column and corresponding DAS unit IP addresses in another column. When the DAS hub 26 receives incoming traffic in a given RAN coverage segment (a "source" RAN coverage segment), the DAS hub 26 may thus refer to the mapping table to find the row that lists the given RAN coverage segment, and the DAS hub 26 may read the other column of the table to identify the corresponding destination DAS antenna unit IP address(es) to which to route the incoming traffic. The DAS hub 26 may then route the incoming traffic via network 40 to the identified destination DAS antenna unit IP address(es). Conversely, when the DAS hub 26 receives outgoing traffic from a particular DAS antenna unit IP address (a "source" DAS antenna unit IP address), the DAS hub 26 may refer to the mapping table to find the row that lists that IP address, and the DAS hub 26 may then read the other column of the table to the identify corresponding destination RAN coverage segment(s) in which to route the outgoing traffic. The DAS hub 26 may then route the outgoing traffic to the RAN 12 in the identified destination RAN coverage segment(s).

FIG. 2 depicts an example of such a symmetric mapping table. As shown in FIG. 2, the left column of the table lists RAN coverage segments A, B, and C, and the right column lists corresponding IP addresses of six example DAS antenna units. (Each RAN coverage segment can be defined in any of the ways noted above or in some other way. For instance, a RAN coverage segment could be a cell sector operating on a particular carrier-frequency and having a particular PN-offset.)

The table of FIG. 2 indicates, by way of example, that (i) RAN coverage segment A corresponds with DAS antenna unit IP addresses 1, 2, 3, and 6, (ii) RAN coverage segment B corresponds with DAS antenna unit IP address 5, and (iii) RAN coverage segment C corresponds with DAS antenna unit IP address 4. Provided with this mapping table in its data storage, DAS hub 26 may accordingly route incoming and outgoing traffic via packet-switched network 40 between RAN 12 and the various DAS antenna units.

It should be understood that exemplary mapping data could be arranged in assorted other ways. For instance, the mapping data could list just a single RAN coverage segment and correlate that single RAN coverage segment with one or more DAS antenna unit IP addresses, so as to indicate which of a plurality of DAS antenna units will function to extend coverage of that RAN coverage segment. Similarly, the mapping data could list just a single DAS antenna unit IP address and correlate that single DAS antenna unit IP address with one or more RAN coverage segments.

As another example, just as the mapping data could correlate a given RAN coverage segment with multiple DAS unit IP addresses as shown in FIG. 2, the mapping data could correlate a given DAS antenna unit IP address with multiple RAN coverage segments. That way, various wireless client devices operating in the coverage area of the given DAS antenna unit could communicate with RAN 12 on different RAN coverage segments. For instance, one wireless client device operating in the coverage area of the DAS antenna unit could communicate with RAN 12 on RAN coverage segment A, while another wireless client device operating in the coverage area of the DAS antenna unit could communicate with RAN 12 on RAN coverage segment B.

In a preferred embodiment, a significant advantage can be provided by allowing mapping data 46 to be configured and modified by a system administrator, or perhaps dynamically by an automated system (based on real-time load measurements, event-scheduling data, or one or more other parameters). By allowing mapping data 46 to be changed when desired, it becomes possible to readily alter correlations between RAN coverage segments and DAS antenna unit IP addresses, so as to alter distribution of RAN coverage among the various DAS antenna units. A change may be advantageous, for instance, when personnel changes or other changes occur in or around the physical space occupied by the DAS 24, or when any of a variety of events make it desirable to change distribution of RAN capacity throughout the DAS.

Mapping data 46 can be made alterable by storing the data in data storage of DAS hub 26 and providing an interface through which a user or system can edit the data, causing the DAS hub 26 to store the changed mapping in data for use in subsequently routing communication traffic between RAN coverage segments and DAS antenna unit IP addresses. In an exemplary embodiment, this interface can be the same setup interface mentioned above for use in assigning an IP address to the DAS hub 26, or it can be an analogous interface. Thus, for instance, DAS hub 26 may be programmed with a web server function and setup interface through which a system administrator could view and edit mapping data 46 through a web browser on terminal 44. Through such an interface, a user may thus change the mapping data to add one or more correlations that did not previously exist, to remove one or more correlations that existed previously, or to otherwise change correlations between RAN coverage segments and DAS antenna unit IP addresses.

Figure 3:
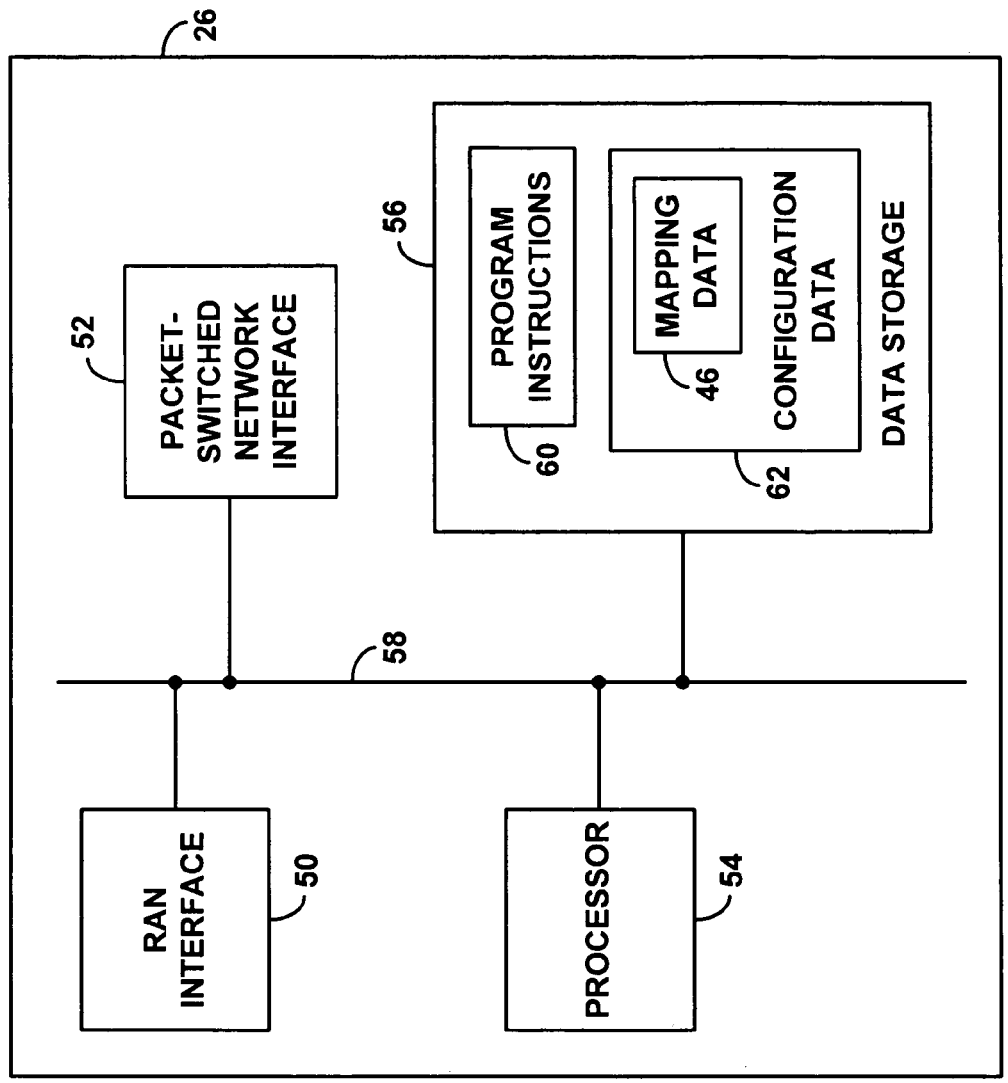
FIG. 3 is a simplified block diagram of a DAS hub arranged in accordance with the exemplary embodiment.

FIG. 3 is next a simplified block diagram depicting an exemplary DAS hub 26 arranged to support the functions described above. As shown, the DAS hub 26 includes a RAN interface 50, a packet-switched network interface 52, a processor 54, and data storage 56, all of which may be coupled together by a system bus, network, or other mechanism 58. These and/or other DAS hub components can reside in a single device or in multiple devices.

RAN interface 50 functions to facilitate communication with RAN 12 on one or more RAN coverage segments. Thus, the RAN interface 50 may include a Qualcomm mobile station modem chipset or other circuitry (including, for instance, a rake-receiver that distinguishes between incoming communication traffic on one RAN coverage segment defining one PN-offset and incoming communication traffic on another RAN coverage segment defining another PN-offset), together with an antenna (for air-interface communication with the RAN) and/or other interface devices (such as an electro-optical coupling for fiber communication with the RAN, etc.)

Packet-switched network interface 52, in turn, functions to facilitate packet-data communication on packet-switched network 40, so that DAS hub 26 can exchange communication traffic with the various DAS antenna units as described above. Packet-switched network interface 52 may comprise an Ethernet network interface card and/or a WLAN (e.g., 802.11) interface, for instance.

Additional circuitry, while not shown, can be provided in DAS hub 26 between RAN interface 50 and packet-switched network interface 52, so as to facilitate communication of traffic between the two interfaces. Such additional circuitry could include, for instance, circuitry for converting between analog and digital signal forms, circuitry for converting between electrical and optical signal forms, or other circuitry now known or later developed.

Processor 54 may comprise one or more general purpose processors (e.g., INTEL microprocessors) and/or one or more special-purpose or dedicated processors (e.g., digital signal processors). Data storage 56, in turn, may comprise one or more volatile and/or non-volatile storage components and may be integrated in whole or in part with processor 54.

As shown, data storage 56 preferably contains program instructions 60 and configuration data 62, including mapping data 46. Program instructions 60 may comprise machine language instructions executable by processor 54 to carry out various functions described herein. For example, program instructions 60 may define the web server and setup interface functions described above, as well as logic to facilitate communication with RAN 12 via RAN interface 50, logic to facilitate communication on packet-switched network 40, and logic to interface between RAN and packet-switched network communications.

As another example, in accordance with the exemplary embodiment, program instructions 60 will preferably define logic to cause processor 50 to automatically consult mapping data 46 when faced with incoming traffic from RAN 12 or outgoing traffic from a DAS antenna unit IP address, so as to determine where to route the traffic as described above.

To facilitate management of these communications, DAS hub 26 may maintain in data storage 52 a separate traffic queue per DAS antenna unit IP address, and perhaps two queues per DAS antenna unit IP address, one for incoming traffic and one for outgoing traffic.

Configuration data 62 may include an indication of the IP address assigned to DAS hub 26 for use in communicating with the various DAS antenna units on packet-switched network 40. Mapping data 46, in turn, preferably defines correlations between RAN coverage segments and DAS antenna unit IP addresses in the manner described above or in some other manner. Note that in an alternative embodiment, mapping data 46 could be stored elsewhere (such as in another node on packet-switched network 40) and could be accessible by DAS hub 26, to facilitate the routing process described herein.

Figure 4:
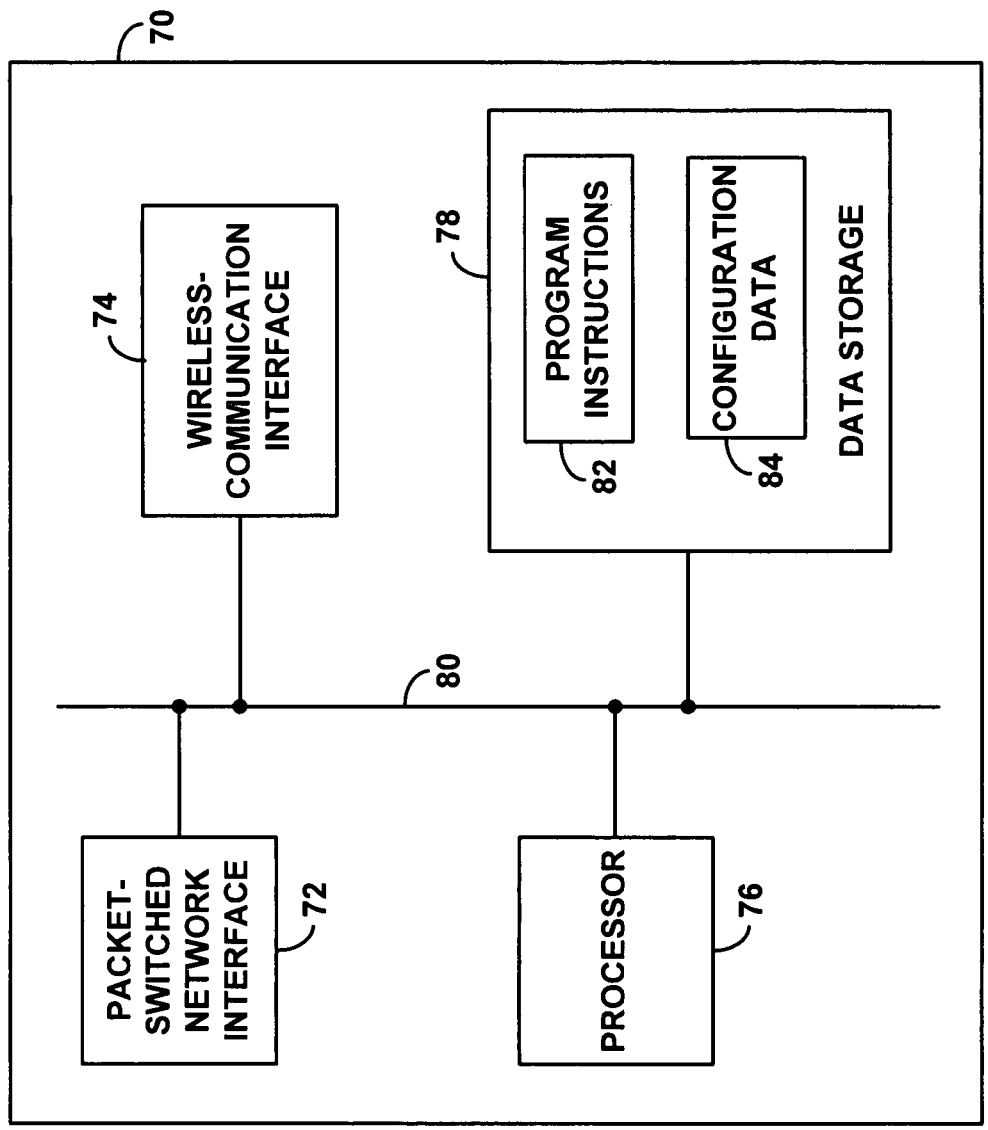
FIG. 4 is a simplified block diagram of a DAS antenna unit arranged in accordance with the exemplary embodiment.

FIG. 4 is next a simplified block diagram of an exemplary DAS antenna unit 70 arranged to support various functions described above. As shown, the DAS antenna unit includes a packet-switched network interface 72, a wireless communication interface 74, a processor 76, and data storage 78, all of which may be coupled together by a system bus, network, or other mechanism 80. These and/or other DAS antenna unit components can reside in a single device or in multiple devices.

Packet-switched network interface 72 may take the same form as the packet-switched interface 52 of DAS hub 26. Wireless communication interface 74 may then take the form of a passive or active circuit, akin to a wireless-repeater circuit for instance, coupled with an antenna structure for engaging in air interface communication with any wireless client devices operating in the local coverage area of the DAS antenna unit. As with the DAS hub 26, additional circuitry can be provided between these two communication interfaces of the DAS antenna unit.

Processor 76, like that of the DAS hub, may comprise one or more general purpose processors and/or one or more special-purpose or dedicated processors. Data storage 78 may then comprise one or more volatile and/or non-volatile storage components possibly integrated in whole or in part with processor 54.

Data storage 78 preferably contains program instructions 82 and configuration data 84. Program instructions 82 may comprise machine language instructions executable by processor 76 to carry out various functions described herein. For example, the program instructions 82 may define the web server and setup interface functions described above, as well as logic to communicate wirelessly with client devices, logic to facilitate communication on packet-switched network 40, and logic to interface between the wireless client communications and packet-switched network communications.

Configuration data 84 may include an indication of the IP address assigned to DAS hub 26 for use in communicating with the DAS hub 26 on packet-switched network 40. Further, DAS hub may include an indication of the IP address of the DAS hub 26, so that the DAS antenna unit can engage in packet-data communications with the DAS hub. Alternatively, the DAS hub could have a predefined network address identifier, domain name, or other identifier, that a DNS server or other proxy or server on network 40 could dynamically translate to the IP address currently assigned to the DAS hub, to facilitate routing traffic to the DAS hub.

Figure 5:
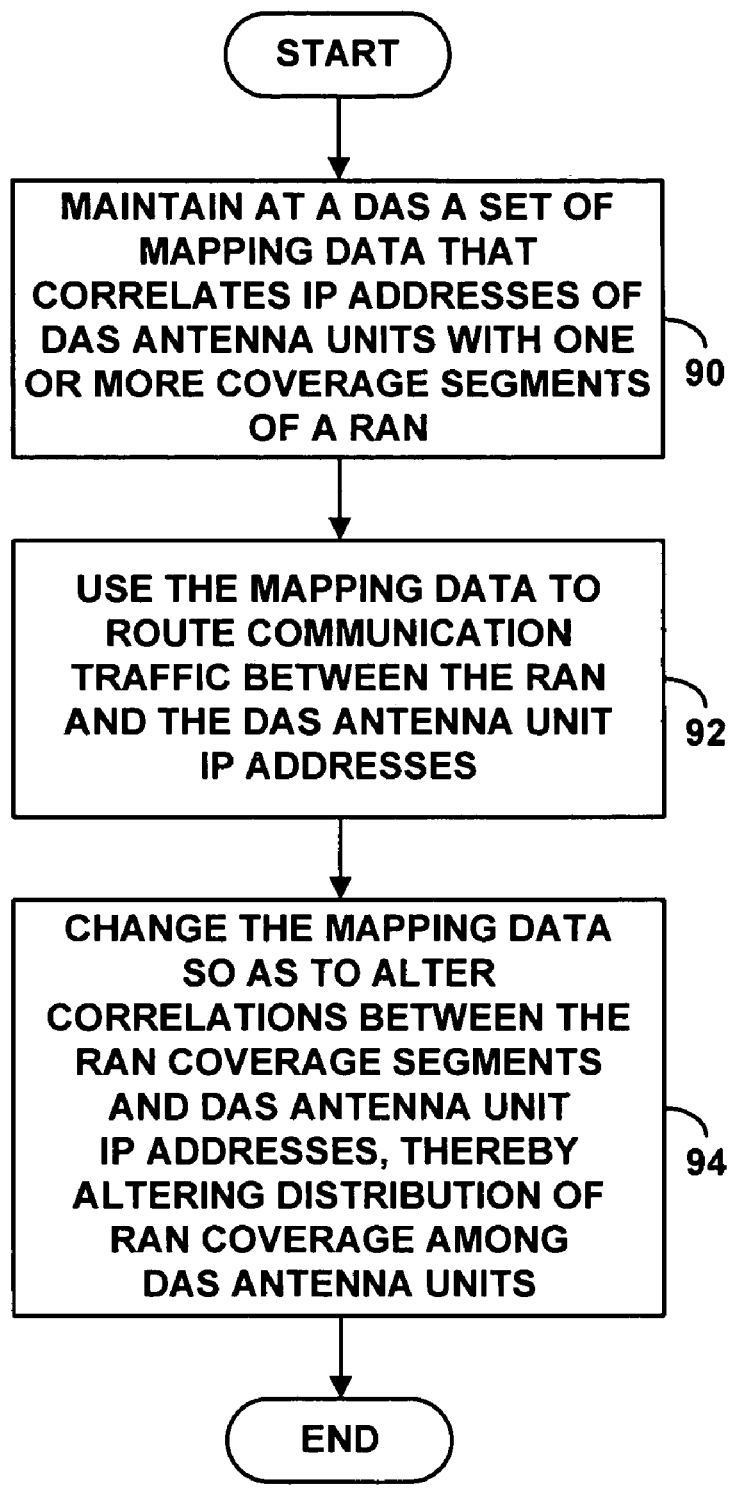
FIG. 5 is a flow chart depicting functions that can be carried out in accordance with the exemplary embodiment.

Finally, FIG. 5 is a simplified flow chart, depicting a set of functions that can be carried out in accordance with an exemplary embodiment of the invention. As shown in the figure, step 90 involves maintaining at a DAS a set of mapping data that correlates IP addresses of DAS antenna units with one or more coverage segments of a RAN. Step 92 then involves using the mapping data to route communication traffic between the RAN and the DAS antenna unit IP addresses. Lastly, step 94 involves changing the mapping data so as to alter correlations between the one or more RAN coverage segments and the DAS antenna unit IP addresses, so as to alter distribution of RAN capacity among the DAS antenna units.

An exemplary embodiment of the invention has been described above. Those skilled in the art will appreciate that changes to the embodiment described can be made without deviating from the scope and spirit of the invention, which is defined by the claims.

We claim:

1. A distributed antenna system (DAS) comprising:
a DAS hub, wherein the DAS hub communicates with a cellular radio access network (RAN) on one or more RAN coverage segments defined by the RAN;
a plurality of DAS antenna units;
a packet-switched network connecting the DAS hub with the DAS antenna units, wherein each DAS antenna unit has an address on the packet-switched network, wherein the packet-switched network comprises an Internet Protocol (IP) network, and wherein each address on the packet-switched network comprises an IP address; and
data storage containing mapping data that correlates the DAS antenna units with the one or more RAN coverage segments, wherein the DAS hub uses the mapping data to route communication traffic between the one or more RAN coverage segments and the network addresses of the DAS antenna units, and wherein the mapping data is alterable to modify correlations between the one or more RAN coverage segments and the IP addresses of the DAS antenna units, so as to alter a distribution of RAN capacity among the DAS antenna units.

2. The distributed antenna system of claim 1, wherein each RAN coverage segments defines a respective PN-offset, and wherein the mapping data correlates RAN coverage segment PN-offsets with DAS antenna unit IP addresses.

3. A distributed antenna system (DAS) comprising:
a DAS hub, wherein the DAS hub communicates with a cellular radio access network (RAN) on one or more RAN coverage segments defined by the RAN;
a plurality of DAS antenna units;
a packet-switched network connecting the DAS hub with the DAS antenna units, wherein each of the DAS antenna units has a respective Internet Protocol (IP) address on the packet-switched network; and
data storage containing mapping data that correlates the one or more RAN coverage segments with the IP addresses of the DAS antenna units,
wherein, when the DAS hub receives incoming communication traffic on a source RAN coverage segment, the DAS hub uses the mapping data to identify at least one DAS antenna unit destination IP address corresponding with the source RAN coverage segment and the DAS hub forwards the incoming communication traffic via the packet-switched network to the at least one identified DAS antenna unit destination IP address, and
wherein the mapping data is alterable to modify correlations between the RAN coverage segments and the IP addresses of the DAS antenna units so as to alter a distribution of RAN capacity among the DAS antenna units.

4. The distributed antenna system of claim 3, wherein, when the DAS hub receives outgoing communication traffic via the packet-switched network from a source IP address of a source DAS antenna unit, the DAS hub uses the mapping data to identify at least one destination RAN coverage segment corresponding with the source IP address and the DAS hub forwards the outgoing communication traffic on the at least one identified destination RAN coverage segment to the RAN.

5. The distributed antenna system of claim 3, wherein the DAS hub contains the data storage.

6. The distributed antenna system of claim 3, wherein the DAS hub communicates with the RAN on each of the one or more RAN coverage segments via one or more connections each selected from the group consisting of a wireless connection, a fiber connection, and a cable connection.

7. The system of claim 3, wherein the DAS hub includes a mobile station modem for receiving the incoming communication traffic from the RAN and for sending outgoing communication traffic to the RAN.

8. A distributed antenna system (DAS) comprising:
- a DAS hub, wherein the DAS hub communicates with a cellular radio access network (RAN) on one or more RAN coverage segments defined by the RAN;
- a plurality of DAS antenna units;
- a packet-switched network connecting the DAS hub with the DAS antenna units wherein each of the DAS antenna units has a respective Internet Protocol (IP) address on the packet-switched network; and
- data storage containing mapping data that correlates the one or more RAN coverage segments with the IP addresses of the DAS antenna units,
- wherein, when the DAS hub receives incoming communication traffic on a source RAN coverage segment, the DAS hub uses the mapping data to identify at least one DAS antenna unit destination IP address corresponding with the source RAN coverage segment and the DAS hub forwards the incoming communication traffic via the packet-switched network to the at least one identified DAS antenna unit destination IP address,
- wherein each of at least a plurality of the RAN coverage segments is a code division multiple access (CDMA) sector defining a respective PN-offset, wherein the mapping data correlates the plurality of RAN coverage segments with the IP addresses of the DAS antenna units at least in part by correlating the RAN coverage segment PN-offsets with the DAS antenna unit IP addresses, and
- wherein when the DAS hub receives the incoming communication traffic on an RAN coverage segment defining a source PN-offset, the DAS hub uses the mapping data to identify at least one DAS antenna unit destination IP address corresponding with the source PN-offset and the DAS hub routes the incoming communication traffic to the at least one identified DAS unit destination IP address.

9. The system of claim 8, wherein the DAS hub includes a rake receiver that distinguishes between incoming communication traffic on one RAN coverage segment defining one PN-offset and incoming communication traffic on another RAN coverage segment defining another PN-offset.

10. A method comprising:
- maintaining at a distributed antenna system (DAS) a set of mapping data that correlates Internet Protocol (IP) addresses of DAS antenna units with one or more coverage segments of a cellular radio access network (RAN);
- using the mapping data to route communication traffic between the RAN and the DAS antenna unit IP addresses; and
- changing the mapping data so as to alter correlations between the one or more RAN coverage segments and the DAS antenna unit IP addresses, to thereby alter distribution of RAN capacity among the DAS antenna units.

11. The method of claim 10, wherein changing the mapping data so as to alter correlations between the one or more RAN coverage segments and the distributed antenna unit IP addresses comprises making a change selected from the group consisting of:
- (i) correlating a given RAN coverage segment with at least one additional DAS antenna unit IP address, and
- (ii) correlating a given DAS antenna unit IP address with at least one additional RAN coverage segment.

12. The method of claim 10, wherein changing the mapping data comprises receiving user input indicative of at least one change to the mapping data, and responsively saving altered mapping data for subsequent use in routing communication traffic between the RAN and the DAS antenna unit IP addresses.

13. The method of claim 10, wherein using the mapping data to route communication traffic between the RAN and the DAS antenna unit IP addresses comprises:
- receiving incoming communication traffic into the DAS on a source coverage segment of the RAN, using the mapping data to identify a DAS antenna unit destination IP address corresponding with the source RAN coverage segment, and forwarding the incoming communication traffic via a packet-switched network to the identified DAS antenna unit destination IP address.

14. The method of claim 13, wherein receiving incoming communication traffic into the DAS on the source coverage segment of the RAN comprises receiving the incoming communication traffic via a link selected from the group consisting of a wireless link, an optical link, and a cable link.

15. A method comprising:
- maintaining at a distributed antenna system (DAS) a set of mapping data that correlates Internet Protocol (IP) addresses of DAS antenna units with one or more coverage segments of a cellular radio access network (RAN); and
- using the mapping data to route communication traffic between the RAN and the DAS antenna unit IP addresses,
- wherein using the mapping data to route communication traffic between the RAN and the DAS antenna unit IP addresses comprises receiving incoming communication traffic into the DAS on a source coverage segment of the RAN using the mapping data to identify a DAS antenna unit destination IP address corresponding with the source RAN coverage segment, and forwarding the incoming communication traffic via a packet-switched network to the identified DAS antenna unit destination IP address,
- wherein each of the one or more RAN coverage segments defines a respective PN-offset, wherein the mapping data correlates the DAS antenna unit IP addresses with the RAN coverage segments at least in part by correlating RAN coverage segment PN-offsets with DAS antenna unit IP addresses, and wherein:
- using the mapping data to identify the DAS antenna unit IP address corresponding with the source coverage segment of the RAN comprises using the mapping data to identify the DAS antenna unit IP address corresponding with the PN-offset of the source RAN coverage segment.

16. The method of claim 13, further comprising:

receiving outgoing communication traffic from a source IP address of a source DAS antenna unit, using the mapping data to identify a destination RAN coverage segment corresponding with the source IP address, and forwarding the outgoing communication traffic to the RAN on the identified destination RAN coverage segment.

17. A method comprising:

maintaining at a distributed antenna system (DAS) a set of mapping data that correlates Internet Protocol (IP) addresses of DAS antenna units with one or more coverage segments of a cellular radio access network (RAN);

using the mapping data to route communication traffic between the RAN and the DAS antenna unit IP addresses; and receiving outgoing communication traffic from a source IP address of a source DAS antenna unit, using the mapping data to identify a destination RAN coverage segment corresponding with the source IP address, and forwarding the outgoing communication traffic to the RAN on the identified destination RAN coverage segment, wherein using the mapping data to route communication traffic between the RAN and the DAS antenna unit IP addresses comprises receiving incoming communication traffic into the DAS on a source coverage segment of the RAN, using the mapping data to identify a DAS antenna unit destination IP address corresponding with the source RAN coverage segment and forwarding the incoming communication traffic via a packet-switched network to the identified DAS antenna unit destination IP address, wherein each RAN coverage segment defines a respective PN-offset, wherein the mapping data correlates the DAS antenna units with the RAN coverage segments at least in part by correlating RAN coverage segment PN-offsets with DAS antenna unit IP addresses, and wherein:

using the mapping data to identify the destination RAN coverage segment corresponding with the source IP address comprises using the mapping data to identify the RAN coverage segment PN-offset corresponding with the source IP address, and forwarding the outgoing communication traffic to the RAN on the identified destination RAN coverage segment comprises forwarding the outgoing communication traffic to the RAN on the RAN coverage segment having the identified RAN coverage segment PN-offset.

* * * * *